United States Patent
Yamasaki

(10) Patent No.: US 10,042,163 B2
(45) Date of Patent: Aug. 7, 2018

(54) ONBOARD IMAGE DISPLAY DEVICE FOR VEHICLE

(71) Applicant: Fuji Jukogyo Kabushiki Kaisha, Tokyo (JP)

(72) Inventor: Mahiro Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/571,537

(22) Filed: Dec. 16, 2014

(65) Prior Publication Data

US 2015/0168721 A1    Jun. 18, 2015

(30) Foreign Application Priority Data

Dec. 18, 2013    (JP) .................................. 2013-260944

(51) Int. Cl.
| | |
|---|---|
| *G09G 5/00* | (2006.01) |
| *G02B 27/01* | (2006.01) |
| *B60K 35/00* | (2006.01) |
| *B60K 37/04* | (2006.01) |

(52) U.S. Cl.
CPC .......... *G02B 27/0101* (2013.01); *B60K 35/00* (2013.01); *B60K 37/04* (2013.01); *G02B 27/01* (2013.01); *B60K 2350/2052* (2013.01); *G02B 2027/015* (2013.01); *G02B 2027/0161* (2013.01); *G02B 2027/0196* (2013.01)

(58) Field of Classification Search
None
See application file for complete search history.

(56) References Cited

U.S. PATENT DOCUMENTS

| | | | | |
|---|---|---|---|---|
| 7,417,681 | B2 * | 8/2008 | Lieberman | G06F 1/1626 345/168 |
| 2006/0145825 | A1 * | 7/2006 | McCall | B60R 25/2045 340/426.35 |
| 2007/0040664 | A1 * | 2/2007 | Johnson | B60Q 1/444 340/467 |
| 2010/0253600 | A1 * | 10/2010 | Seder | B32B 17/10036 345/7 |

(Continued)

FOREIGN PATENT DOCUMENTS

| | | |
|---|---|---|
| CN | 1666248 A | 9/2005 |
| JP | 2006-205955 | 8/2006 |
| JP | 2010-167830 | 8/2010 |

OTHER PUBLICATIONS

Chinese Office Action dated Apr. 19, 2017 issued in corresponding Chinese Application No. 201410767228.3.

*Primary Examiner* — Stephen T Reed
(74) *Attorney, Agent, or Firm* — Troutman Sanders LLP

(57) ABSTRACT

An onboard image display device for a vehicle includes a projector that projects an image including information conveyed to a passenger, the information including a state of a vehicle and a warning, the projected image being displayed on a window glass of the vehicle. The projector is provided in a space which is formed by a plate-shaped member in the vehicle. For example, the projector is mounted in an inner panel reinforcement of an inner panel of a side door. That is, the projector is mounted within a space which is originally provided by the inner panel reinforcement to ensure reinforcement function. Image light from the projector is projected on the window glass of the side door.

7 Claims, 6 Drawing Sheets

(56) References Cited

U.S. PATENT DOCUMENTS

| | | | | |
|---|---|---|---|---|
| 2011/0267702 A1* | 11/2011 | Fujimoto | ............ | G02B 27/0101 359/633 |
| 2012/0089273 A1* | 4/2012 | Seder | .................... | B60Q 1/268 701/2 |
| 2012/0170130 A1* | 7/2012 | Sasaki | ................... | B60K 35/00 359/630 |
| 2012/0274458 A1* | 11/2012 | Wagner | ................. | B60Q 1/302 340/435 |
| 2013/0235351 A1* | 9/2013 | Sachdev | ................... | B60R 1/00 353/13 |
| 2013/0307706 A1* | 11/2013 | Kriezman | .............. | B60Q 1/503 340/988 |
| 2014/0015637 A1* | 1/2014 | Dassanayake | ..... | G07C 9/00174 340/5.54 |
| 2015/0081167 A1* | 3/2015 | Pisz | ................... | B60H 1/00642 701/36 |

* cited by examiner

ONBOARD IMAGE DISPLAY DEVICE FOR VEHICLE

CROSS-REFERENCE TO RELATED APPLICATIONS

The present application claims priority from Japanese Patent Application No. 2013-260944 filed on Dec. 18, 2013, the entire contents of which are hereby incorporated by reference.

BACKGROUND

1. Technical Field

The present disclosure relates to an onboard image display device for a vehicle, and particularly to an onboard image display device for a vehicle that displays an image by irradiating a window glass of a vehicle with image light.

2. Related Art

In recent years, onboard image display devices for a vehicle, so-called head-up displays (HUD) have been widely spread as a device to inform a driver of vehicle-related information such as a vehicle speed and navigation information (see, for example, Japanese Unexamined Patent Application Publication (JP-A) No. 2010-167830). The head-up displays each includes a projector that projects image light of an image and a display unit that displays the image projected from the projector.

The projector includes, for example, a light source, a transmissive liquid crystal panel that allow outgoing light from the light source to be entered and transmitted, a plane mirror that causes image light to be reflected, the image light being transmitted through the transmissive liquid crystal panel, and a concave mirror that divergently reflects the image light which has been reflected by the plane mirror. Each of devices is housed in a housing. It is to be noted that information displayed on the above-mentioned liquid crystal panel is reflected and enlarged to be displayed.

The display unit is, for example, a windshield glass and configured to receive image light from the projector for image formation and to display various types of information. Normally, the projector of a head-up display is provided within an instrument panel and image light from the projector is projected and displayed on the windshield glass on the driver side.

Japanese Unexamined Patent Application Publication (JP-A) No. 2006-205955 discloses a head-up display in which the projector is a stand-alone projector. In the implementation in JP-A No. 2006-205955, the projector is placed on an instrument panel, and image light from the projector is projected and displayed on the windshield glass on the driver side.

In the head-up display disclosed in JP-A No. 2010-167830, a projector is installed within an instrument panel, particularly on the rear-surface side of a meter, and a display unit is installed on the driver side of the windshield glass. Normally, in the instrument panel, instruments such as a speedometer, a tachometer, a fuel gauge, a water temperature gauge, and an odometer are disposed, the instruments indicating information necessary for driving a vehicle. In addition, a device such as an air duct is also disposed so that the instrument panel has no wasted space therein. Since the projector is to be installed within the instrument panel having such conditions, the capacity within the instrument panel needs to be increased in order to install the projector. Therefore, the capacity of the instrument panel has been increased to install the projector, and the space within the vehicle has been reduced accordingly. Also, the stand-alone projector disclosed in JP-A No. 2006-205955 is installed with its main body exposed, thereby causing a problem that the projector may present an obstacle and stability of irradiation and display of image light reduces due to a contact or the like.

SUMMARY OF THE INVENTION

The present disclosure has been made in view of the above-described problems and provides an onboard image display device for a vehicle that does not need to ensure a separate space for installation in the vehicle.

A first aspect of the present disclosure provides an onboard image display device for a vehicle including a projector that projects an image including information conveyed to a passenger. The information includes a state of a vehicle and a warning. The projected image is displayed on a window glass of the vehicle. The projector is provided in a space which is formed by a plate-shaped member in the vehicle.

The plate-shaped member may be an inner panel of an opening and closing part of the vehicle, and the projector may be provided at a position near the window glass inward of the inner panel.

The projector may be provided in a reinforcement within the inner panel, and the reinforcement may be provided with an opening for projecting image light from the projector on the window glass.

The projector may be mounted on a plate for installing other components in common, the plate being provided in the inner panel or in the reinforcement.

The plate-shaped member may be a pillar of the vehicle, and the projector may be mounted in a depressed portion provided in the pillar.

DETAILED DESCRIPTION

Hereinafter, an implementation of the onboard image display device for a vehicle of the present disclosure will be described in detail with reference to the accompanying drawings.

(First Implementation)

Figure 1:
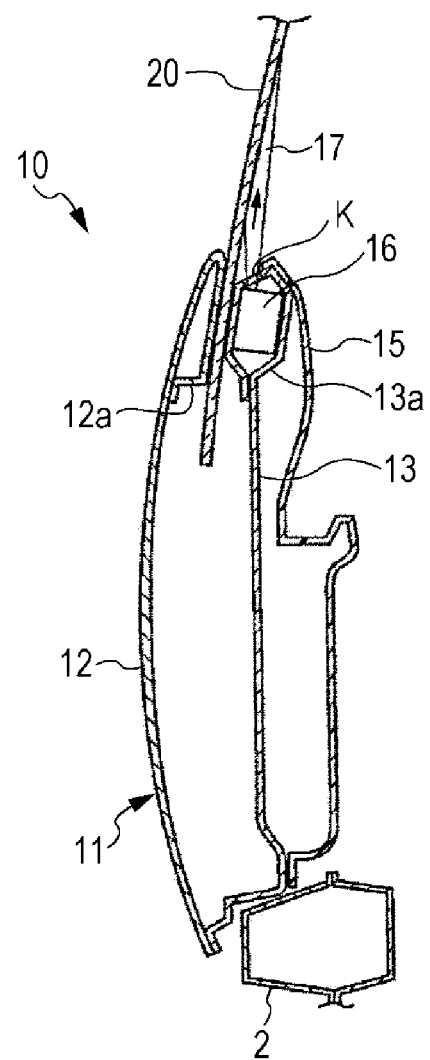
FIG. 1 is a schematic cross-sectional view of a side door according to a first implementation of an onboard image display device for a vehicle of the present disclosure, where a projector is installed in the door.
Figure 2:
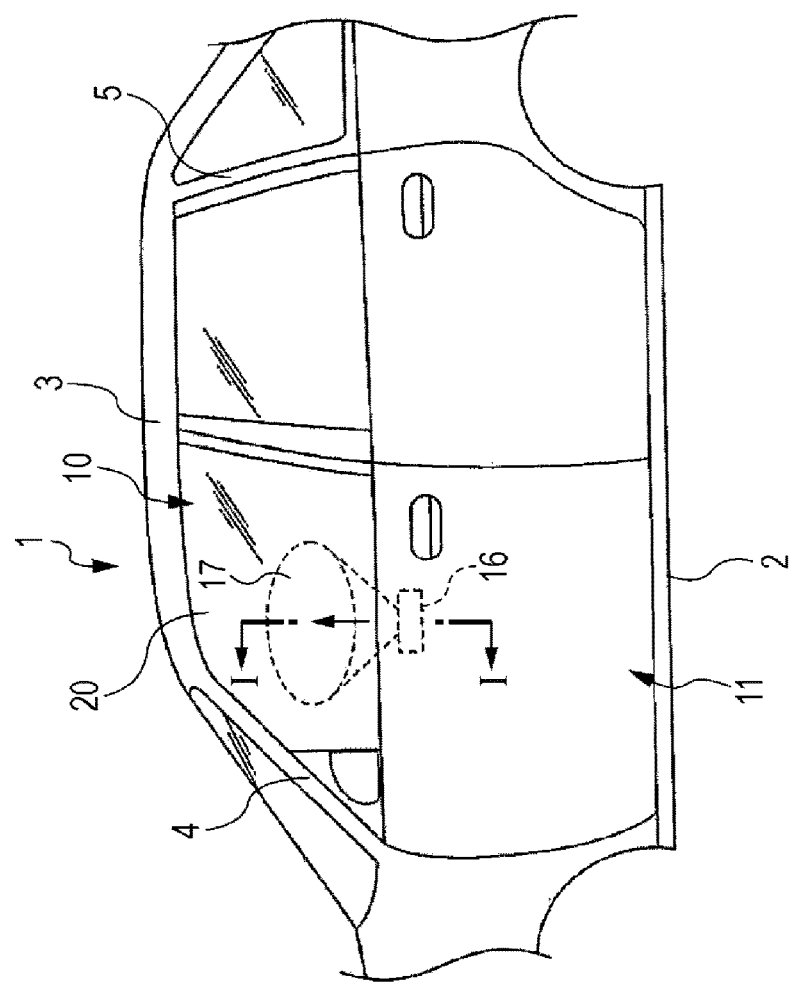
FIG. 2 is a schematic side view of the side door of FIG. 1.

FIG. 1 is a schematic cross-sectional view of a side door according to a first implementation of an onboard image display device for a vehicle of the present disclosure. FIG. 2 illustrates a schematic side view of a side door in which a projector is installed. FIG. 1 corresponds to a schematic cross-sectional view of the side door, taken along line I-I of FIG. 2. A vehicle main body 1 has, on each of the right and left sides, a side sill 2 that extends in a fore-and-aft direction along the lower portion of the vehicle cabin, a side rail 3 that extends in a fore-and-aft direction along the upper portion of the vehicle cabin, a front pillar 4 that extends in a vertical direction and connects the front end of the side sill 2 and the front end of the side rail 3, and a rear pillar 5 that extends in a vertical direction and connects the rear end of the side sill 2 and the rear end of the side rail 3. The vehicle main body 1 further includes a center pillar 6 that extends in the vertical direction and connects the side sill 2 and the side rail 3 between the front pillar 4 and the rear pillar 5. A door opening for a side door 10 is formed between the front pillar 4 and the center pillar 6, the door opening being open at a side of a vehicle body.

As illustrated in FIG. 1, the side door 10 has a door main body 11 in which an outer panel 12 outward of the vehicle body and an inner panel 13 inward of the vehicle body are disposed to face each other. A door trim 15 is disposed inwardly of the inner panel 13 in the vehicle body, the door trim being composed of, for example, a synthetic resin such as a polypropylene.

In the upper areas of the outer panel 12 and the inner panel 13, there are respectively formed an outer panel reinforcement 12a and an inner panel reinforcement 13a that extend in a fore-and-aft direction of the vehicle main body 1.

In the present implementation, a projector 16 is mounted within the inner panel reinforcement 13a. That is, projector 16 is mounted within a space which is originally provided by the inner panel reinforcement 13a to ensure reinforcement function. The mounting is performed by securing the case of the projector 16 and the inner panel reinforcement 13a with a screw (not illustrated). Also, an upper portion of the inner panel 13 is provided with an opening K for projecting image light 17 from the projector 16.

In this manner, the projector 16 is mounted within the inner panel reinforcement 13a at the upper portion of the inner panel 13, and thus it is unnecessary to reserve a new space for mounting. In addition, the projector 16 is protected against an impact from the side because the projector 16 is mounted within the inner panel reinforcement 13a.

In FIG. 1, the projector 16 has, within the case, a light source, a transmissive liquid crystal panel that allow outgoing light from the light source to be entered and transmitted, a plane mirror that causes image light to be reflected, the image light being transmitted through the liquid crystal panel, and a concave mirror that divergently reflects the image light which has been reflected by the plane mirror.

The image light 17 from the projector 16 is designed to be projected and displayed on a predetermined section of a window glass 20 of the side door 10, the section being inward of the vehicle body (see FIG. 2). In the present implementation, the projector 16 is within the side door 10 and display is made on the window glass 20 of the side door 10, and thus information to be conveyed to a passenger may be displayed when the attention of the passenger is focused on the left side. For example, the conveyed information includes a warning against the possibility of getting a pedestrian or a motorcycle caught in the vehicle at the time of left turn.

According to the present implementation, without providing a new space for installing the projector 16 of the onboard image display device for a vehicle, the projector 16 is mounted in a space which is originally provided by the inner panel reinforcement 13a of the side door 10 to ensure reinforcement function. The image light 17 from the projector 16 is displayed on the window glass 20 of the side door 10.

(Second Implementation)

Figure 3A:
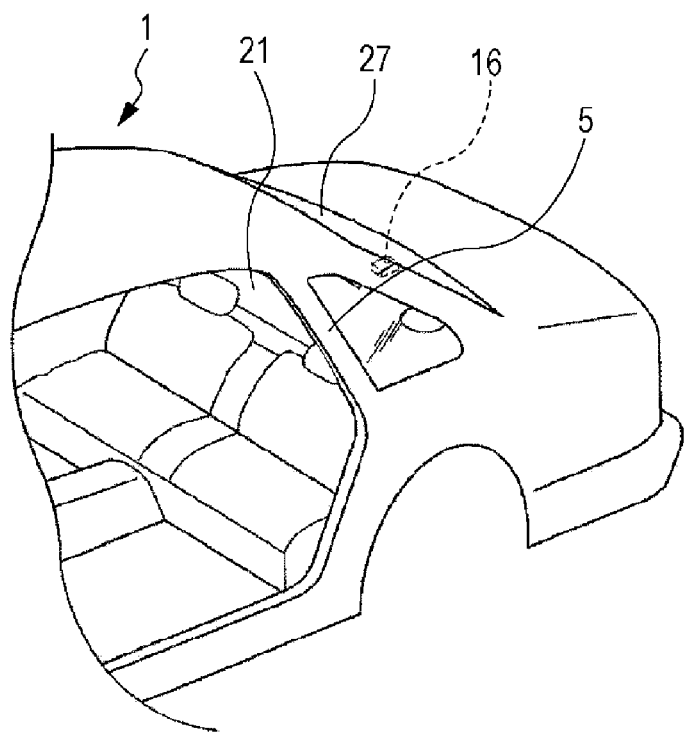
FIG. 3A is a schematic explanatory diagram illustrating the rear of a vehicle main body.
Figure 3B:
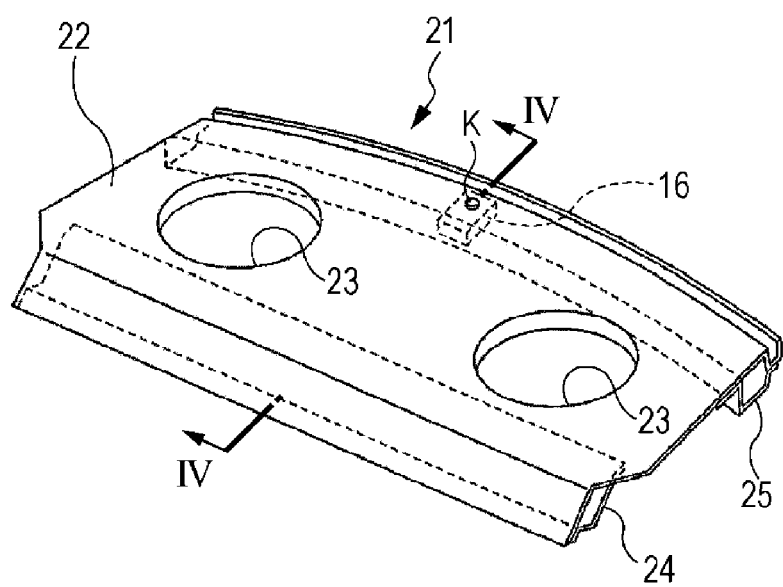
FIG. 3B is a schematic explanatory diagram of a rear shelf, according to a second implementation of the onboard image display device for a vehicle of the present disclosure, where the projector is installed within a reinforcement of the rear shelf.

FIG. 3A illustrates a schematic perspective view of the rear of a vehicle main body and FIG. 3B illustrates a schematic perspective view of a rear shelf, according to a second implementation of the onboard image display device for a vehicle of the present disclosure. A rear shelf 21 is installed between the right and left rear pillars 5 rearward of the seat back of the rear seat so as to provide a partition between the vehicle cabin and a trunk room. The rear shelf 21 has a rear shelf panel 22 which has openings 23 for mounting speakers on the right and left.

Figure 4:
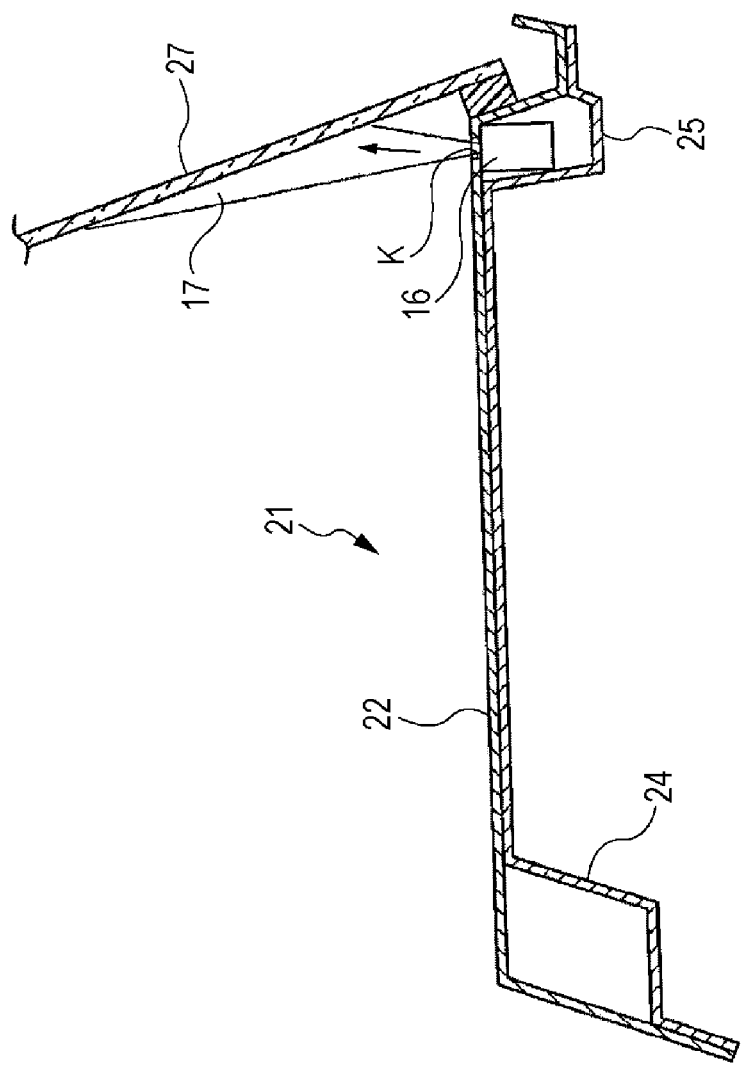
FIG. 4 is a schematic cross-sectional view of the rear shelf of FIG. 3B.

FIG. 4 illustrates a schematic cross-sectional view of an area including the projector. FIG. 4 is a schematic cross-sectional view taken along line IV-IV of FIG. 3B. As illustrated in FIG. 4, the rear shelf panel 22 is provided with a rear reinforcement 25 and a front reinforcement 24 that extend in a vehicle width direction. The rear reinforcement 25 and the front reinforcement 24 ensure the rigidity of the rear shelf panel 22 as well as the rigidity of the vehicle body by connecting the right and left rear pillars 5.

In the present implementation, the projector 16 is mounted at substantially the center in a width direction within the rear reinforcement 25 of the rear shelf panel 22. That is, the projector 16 is mounted in a space which is originally provided by the rear reinforcement 25 to ensure reinforcement function. The mounting is performed by securing the case of the projector 16 and the rear reinforcement 25 with a screw (not illustrated). Also, the rear reinforcement 25 is provided with an opening K for projecting the image light 17 from the projector 16. In this manner, the projector 16 is mounted within the rear reinforcement 25 of the rear shelf 21, and thus it is unnecessary to reserve a new space for mounting. In addition, the projector 16 is protected against an impact from the rear because the projector 16 is mounted within the rear reinforcement 25.

The image light from the projector 16 is designed to be displayed on a rear window glass 27 of the vehicle. Therefore, information to be conveyed to a passenger may be displayed when the attention of the passenger is focused on the rear of the vehicle. For example, the information includes the environment around the vehicle when the vehicle moves back, specifically the presence of an obstacle in the rear and/or a rear view.

According to the present implementation, the projector 16 of the onboard image display device for a vehicle does not need a new space for installation, and is mounted in a space which is originally provided by the rear reinforcement 25 of the rear shelf 21 to ensure reinforcement function. The image light 17 from the projector 16 is displayed on the rear window glass 27.

(Third Implementation)

Figure 5:
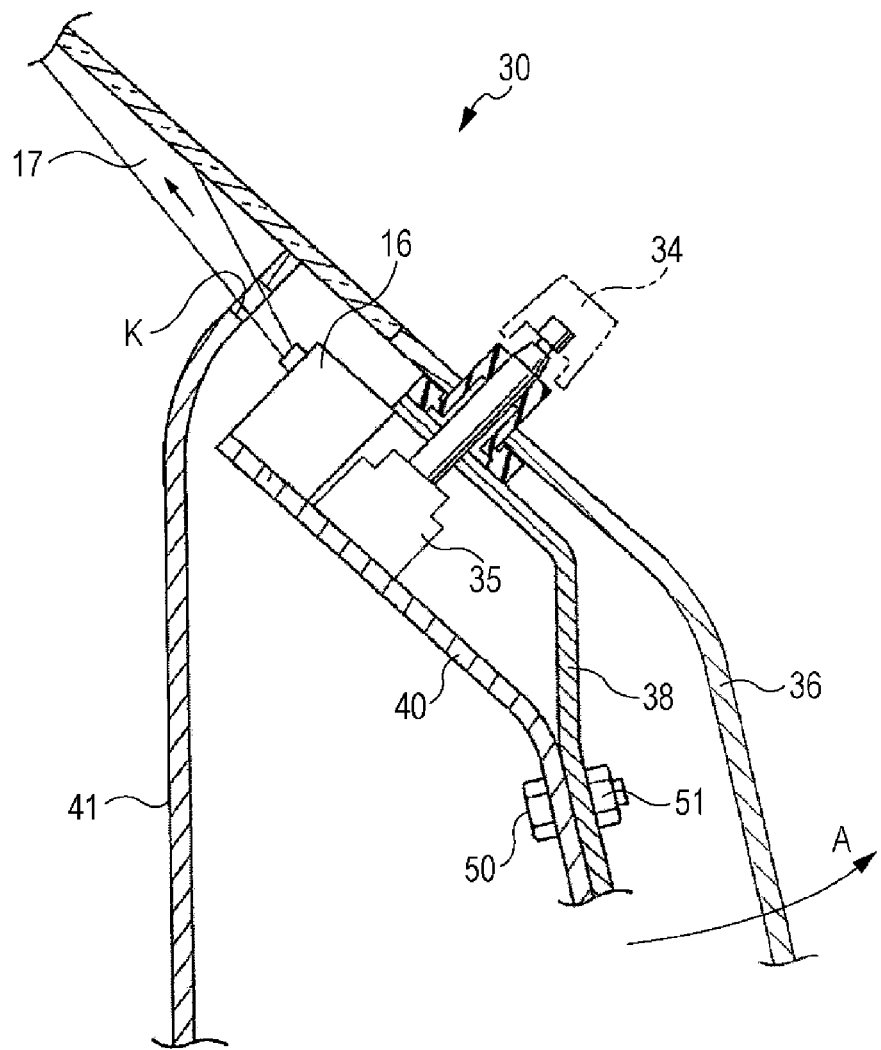
FIG. 5 is a schematic cross-sectional view of a rear gate according to a third implementation of the onboard image display device for a vehicle of the present disclosure, where the projector is installed within the rear gate.

FIG. 5 illustrates a schematic cross-sectional view of a rear gate according to a third implementation of the present disclosure. FIG. 5 illustrates the case where the projector 16 of the onboard image display device for a vehicle is installed in the inner panel of the rear gate, particularly, installed on a base member for a rear wiper mounted in the inner panel. A rear opening (not illustrated) which is formed in the rear of the vehicle body is opened and closed by the rear gate 30. A rear wiper 34 is mounted in the rear gate 30 as an example.

FIG. 5 illustrates a schematic cross-sectional view of the section in which the projector 16 is installed. The rear window glass is fixedly mounted on the upper half of the rear gate 30 and the lower half thereof forms a hollow-structured body including the inner panel 38 and the outer panel 36. In FIG. 5, the boundary portion between the rear window glass and the outer panel 36 is schematically illustrated. Also, arrow A indicates the direction in which the rear gate 30 is opened.

A rear gate trim 41 is mounted on the inner panel 38 inwardly of the vehicle body. The base member 40 is fixed to the inner panel 38 via a bolt 50 and a nut 51 at an area where the rear wiper 34 is present. The (schematically illustrated) drive mechanism 35 of the rear wiper 34 is then fixed to the base member 40.

In the present implementation, the projector 16 is mounted on the above-mentioned base member 40. That is, the projector 16 is mounted on the base members 40 for the rear wiper within the inner panel 38 in common. Therefore, the projector 16 is compactly housed along with other components and mounted in a reinforced section without reserving a space for installing the projector separately, thereby making it possible to prevent blur of an image due to vibration. The mounting is performed by securing the case of the projector 16 and the base member 40 with a screw (not illustrated). Also, the rear gate trim 41 is provided with an opening K for projecting the image light 17 from the projector 16. In this manner, the projector 16 is mounted on the base member 40 of the inner panel 38 within the rear gate 30, and thus it is unnecessary to reserve a new space for mounting. In addition, the projector 16 is protected against an impact from the rear because the projector 16 is located in the rear gate 30.

The image light 17 from the projector 16 is designed to be displayed on the rear window glass 27 of the vehicle. Therefore, similarly to the second implementation, information to be conveyed to a passenger may be displayed when the attention of the passenger is focused on the rear of the vehicle. For example, the information includes the environment around the vehicle when the vehicle moves back, specifically the presence of an obstacle in the rear and/or a rear view.

According to the present implementation, the projector 16 of the onboard image display device for a vehicle is mounted on a plate for installing other components in the inner panel 38 within the rear gate 30 in common, that is, mounted on the base members 40 for the rear wiper. Therefore, the projector 16 is compactly housed along with other components and mounted in a reinforced section without reserving a space for installing the projector separately, thereby making it possible to prevent blur of an image due to vibration. The image light 17 from the projector 16 is displayed on the rear window glass 27.

(Fourth Implementation)

Figure 6:
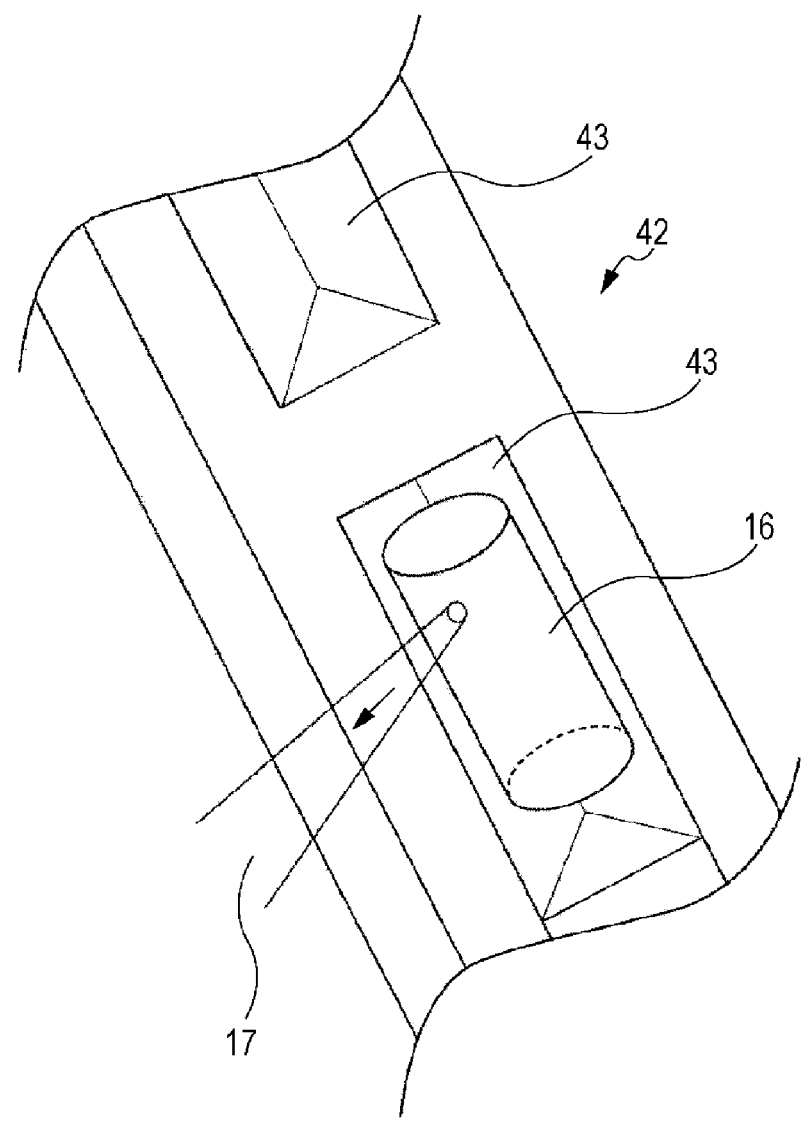
FIG. 6 is a schematic explanatory diagram of a rear pillar according to a fourth implementation of the onboard image display device for a vehicle of the present disclosure, where the projector is installed in a depressed portion of the rear pillar.

FIG. 6 is a schematic explanatory diagram of a rear pillar according to a fourth implementation of the present disclosure, and illustrates a rear pillar 42 on the left side of the vehicle. The rear pillar 42 includes depressed portions 43 and projecting portions (not illustrated) on its surface in consideration of deformation at the time of a collision and a pillar strength. However, normally, a rear pillar trim (not illustrated) is arranged over the surface, and thus the above-mentioned depressed portions 43 and projecting portions are designed not to be visible directly.

In the present implementation, the projector 16 is mounted in an existing depressed portion 43 of the pillar 42. The mounting is performed by securing the case of the projector 16 and the depressed portion 43 of the pillar with a screw (not illustrated). The case of the projector 16 is in a cylindrical shape so as to be easily housed. In addition, the rear pillar trim (not illustrated) arranged over the surface of the rear pillar 42 is provided with an opening so that the image light 17 from the projector 16 is not blocked. In this manner, the projector 16 is mounted in the depressed portion 43 of rear pillar 42, and thus it is unnecessary to reserve a new space for mounting. In addition, the projector 16 is protected against an impact because the rear pillar trim (not illustrated) is arranged over the depressed portion 43.

The image light 17 from the projector 16 is designed to be projected on the rear window glass. Therefore, similarly to the second and third implementations, information to be conveyed to a passenger may be displayed when the attention of the passenger is focused on the rear of the vehicle. For example, the information includes the environment around the vehicle when the vehicle moves back, specifically the presence of an obstacle in the rear and/or a rear view.

According to the present implementation, the projector 16 of the onboard image display device for a vehicle does not need a new space for installation, and is mounted in an existing depressed portion of the pillar. The image light 17 from the projector 16 is displayed on the rear window glass.

It is to be noted that each of the above-described implementations has been illustrated as an example including the geometry of the vehicle main body, and is not limited to the example. For example, the mounting position of the projector 16 is not limited to the position in the implementations, and a new space for mounting the projector 16 is unnecessary and the projector 16 may be mounted at a position where the projector 16 may be mounted using an existing space, for example, within a reinforcement in the roof, or in a depressed portion of the center pillar, the front pillar, and the rear gate pillar. Although the case of the projector 16 of the onboard image display device for a vehicle e is illustrated as a rectangular shape or a cylindrical shape, the case may be formed in any shape which is easy to be mounted in an existing space. Furthermore, although an image includes information to be conveyed to a passenger, such as a state of the vehicle and a warning, for example when the vehicle has a speed exceeding a legal speed limit, as a simplest warning, only a red laser beam may be emitted to the windshield glass to be displayed thereon.

The invention claimed is:

1. An onboard image display device for a vehicle comprising a projector that projects an image including information conveyed to a passenger of the vehicle, wherein
the projected image is displayed on a window glass of the vehicle, and
the projector is provided on a plate-shaped member in the vehicle,
wherein the plate-shaped member is provided within a reinforcement, and
wherein the projector is mounted on the plate-shaped member with other vehicle-based components comprising at least one component causing vibration.

2. The onboard image display device for a vehicle according to claim 1, wherein the projector is provided at a position near the window glass and inward of at least a portion of the plate-shaped member.

3. The onboard image display device for a vehicle according to claim 1, wherein the at least one component causing vibration comprises a wiper.

4. The onboard image display device for a vehicle according to claim 1, wherein the projector is provided inside of the reinforcement and is mounted to the center of the length of the reinforcement such that the projector is protected against an impact from outside.

5. An onboard image display device for a vehicle comprising:
a vehicle reinforcement member of a main body of the vehicle, configured to reinforce a body structure of the vehicle, wherein the main body is separate from doors of the vehicle; and
a projector;
wherein the projector projects an image including information conveyed to a passenger of the vehicle,
wherein the projected image is displayed on a rear window glass of the vehicle,
wherein the vehicle reinforcement member is provided below a rear shelf, the vehicle reinforcement member extends in a vehicle width direction, the vehicle reinforcement member has a first end connecting a right rear pillar and a second end connecting a left rear pillar, the rear shelf being provided between the right and left rear pillars rearward of a seat back of a rear seat in the vehicle and configured to provide a partition between a cabin of the vehicle and a trunk in the vehicle, the vehicle reinforcement member supporting rigidity of the rear shelf by connecting the right and left rear pillars, and
wherein a cavity is formed between the vehicle reinforcement member and the rear shelf, the cavity extends in the vehicle width direction from the right rear pillar to the left rear pillar, and the projector is disposed in the cavity.

6. The onboard image display device for a vehicle according to claim 5, wherein the vehicle reinforcement member comprises at least one depressed portion configured for strength and collision deformation.

7. An onboard image display device for a vehicle comprising a projector that projects an image including information conveyed to a passenger of the vehicle, wherein
the projected image is displayed on a rear window glass of the vehicle,
a reinforcement member is provided below a rear shelf, the reinforcement member extends in a vehicle width direction, the reinforcement member has a first end connecting a right rear pillar and a second end connecting a left rear pillar, the rear shelf being provided between the right and left rear pillars rearward of a seat back of a rear seat in the vehicle and configured to provide a partition between a cabin of the vehicle and a trunk in the vehicle, the reinforcement supporting rigidity of the rear shelf by connecting the right and left rear pillars, and
a cavity is formed between the reinforcement member and the rear shelf, the cavity extends in the vehicle width direction from the right rear pillar to the left rear pillar, and the projector is disposed in the cavity.

* * * * *